US005714472A

United States Patent [19]
Gray et al.

[11] Patent Number: 5,714,472
[45] Date of Patent: Feb. 3, 1998

[54] ENTERNAL FORMULATION DESIGNED FOR OPTIMIZED NUTRIENT ABSORPTION AND WOUND HEALING

[75] Inventors: Debora Gray, Chicago; Nancy S. Schmelkin, Buffalo Grove; John Alexander, Kenilworth; David A. Mark, Oak Park; Diana Twyman, Chicago, all of Ill.

[73] Assignee: Nestec Ltd., Vevey, Switzerland

[21] Appl. No.: 530,877

[22] Filed: Sep. 20, 1995

Related U.S. Application Data

[63] Continuation-in-part of Ser. No. 172,587, Dec. 23, 1993, abandoned.

[51] Int. Cl.$^6$ .............................. A61K 38/00; A23J 1/00; A23G 3/00
[52] U.S. Cl. .................. 514/21; 514/2; 514/23; 514/54; 514/558; 514/560; 514/943; 426/72; 426/607; 426/656; 426/658; 424/DIG. 13
[58] Field of Search ..................... 514/21, 2, 23, 514/54, 558, 560, 943; 426/72, 607, 656, 658; 424/DIG. 13

[56] References Cited

U.S. PATENT DOCUMENTS

| 4,358,465 | 11/1982 | Brule et al. | 426/42 |
|---|---|---|---|
| 4,361,587 | 11/1982 | Brule et al. | 426/42 |
| 4,427,658 | 1/1984 | Maubois et al. | 424/177 |
| 4,495,176 | 1/1985 | Brule et al. | 424/128 |
| 4,670,268 | 6/1987 | Mahmoud | 426/72 |
| 4,740,462 | 4/1988 | Brule et al. | 435/69 |
| 4,816,398 | 3/1989 | Brule et al. | 435/69 |
| 4,980,450 | 12/1990 | Brule et al. | 530/300 |
| 5,028,589 | 7/1991 | Brule et al. | 514/7 |
| 5,053,387 | 10/1991 | Alexander | 514/2 |
| 5,166,189 | 11/1992 | Trunlo | 514/2 |
| 5,221,668 | 6/1993 | Henningfield et al. | 514/23 |

FOREIGN PATENT DOCUMENTS 0189160  7/1986  European Pat. Off.

OTHER PUBLICATIONS

Ross Laboratories Brochure, *Specialized Elemental Nutrition With Glutamine—The Role of ALITRAQ™ Specialized Elemental Nutrition With Glutamine* (1991).
Ross Laboratories Brochure, *Introducing ALITRAQ™ Specialized Elemental Nutrition With Glutamine* (1992).
Ross Laboratories Brochure, *Introducing PERATIVE™* (1992).
Sandoz Nutrition Brochure, *IMPACT™* (1993).
Sandoz Nutrition Brochure, *Introducing IMPACT™* (1989).
Sandoz Nutrition Brochure, *IMPACT™* (1991).
Mead Johnson, *Enteral Nutrionals Product Handbook*, bearing Nos. A2688–2693.
Mead Johnson Enternal Nutritionals Brochure bearing No. B00083.
Mead Johnson Brochure bearing Nos. B00322–B00323.
Mead Johnson, *Metabolic and Nutrition Support for Trauma and Burn Patients A Symposium*, Abstracts, pp. 1–13 (1982).
*Nutritional Care of Metabolically Stressed Patients*, Proceedings from the Metabolic and Nutrition Support for Trauma and Burn Patients Symposium, White Sulphur Springs, West Virginia, pp. 1–77 (1983).
*Principles of Nutritional Support: Proceedings From the Metabolic and Nutrition Support for Trauma and Burn Patients Symposium*, White Sulphur Springs, West Virginia, pp. 1–25 (1982).
*Symposium Highlights Metabolic and Nutrition Support for Trauma and Burn Patients*, White Sulphur Springs, West Virginia, pp. 1–26 (1982).
*TraumaCal, Feeding the Hypermetabolic Patient, Clinical Experience*, A Symposium, pp. 1–74 (1983).
TraumaCal Product Cards bearing Nos. B000001–B000010.
TraumaCal Documents bearing Nos. B00088–B00105.
TraumaCal Document bearing No. B00181.
TraumaCal Document bearing Nos. B00261–B00265.
TraumaCal Document bearing No. B00293.
TraumaCal Document bearing Nos. B00384–B00385.
TraumaCal Label bearing No. B00441.
TraumaCal Brochure bearing Nos. B00567–B00570.

*Primary Examiner*—Cecilia J. Tsang
*Assistant Examiner*—Abdel A. Mohamed
*Attorney, Agent, or Firm*—Hill, Steadman & Simpson

[57] ABSTRACT

The present invention provides an enteral nutritional formulation that meets the nutrient requirements of intensive care patients who may have compromised absorption capacity. The present invention meets the unique nutrient needs of the patient that are generated due to tissue repair and healing requirements. To this end, in an embodiment the present invention provides a method for providing nutritional support to intensive care patients comprising the steps of administering a therapeutically effective amount of a composition comprising: a protein source; a carbohydrate source; and a lipid source including a source of medium chain triglycerides, a source of omega-3 fatty acids, and a source of omega-6 fatty acids.

22 Claims, No Drawings

ENTERAL FORMULATION DESIGNED FOR OPTIMIZED NUTRIENT ABSORPTION AND WOUND HEALING

This application is a continuation-in-part of U.S. application Ser. No. 08/172,857 entitled: "ENTERAL FORMULATION DESIGNED FOR OPTIMIZED NUTRIENT ABSORPTION AND WOUND HEALING" filed Dec. 23, 1993, now abandoned.

BACKGROUND OF THE INVENTION

The present invention relates to nutritionally fortified pharmaceutical compositions. More specifically, the present invention relates to compositions for use in intensive care patients.

Intensive care patients describe a broad population of patients who may suffer from a variety of diseases or insults. These patients, however, exhibit some similar requirements. For example, patients suffering from traumatic injury, burns, post-surgery, and some disease states have a significant need for increased nutrients and energy as compared to individuals who are not challenged by such metabolic stress. Indeed, non-essential nutrients and substances that a body typically can synthesize in adequate supply may become limiting. Additionally, absorption of nutrients from the gut can be compromised even when no direct injury to the gastrointestinal system exists.

Many intensive care patients are fed either with parenteral formulations or enteral formulations either to replace or supplement a typical diet. For example, in 1991, of an estimated 2.4 million trauma patients in the United States, 13% (310,000) required nutrition support beyond food. Of these patients, 62% of the patients were supported using enteral nutrition, tube-feeding and 30% oral supplements, while 38% were initially supported using parenteral nutrition and progressed to tube-feeding, if they survived. Similarly, of about 106,000 burn patient admissions in 1991 in the U.S., approximately 20% (21,000) required nutritional support. Of this group, 95% were started on enteral nutrition, 70% began on tube feeding and 30% started on oral supplements.

Numerous enteral formulations have been targeted for trauma and burn patients. These products include: Mead-Johnson's TRAUMACAL®; Sandoz's IMPACT®; Abbott Laboratories' ALITRAQ®; and McGaw's IMMUN-AID®. Although such products are used in an attempt to treat and/or provide nutritional requirements for such patients, the inventors of the present invention do not believe that these products meet the needs of such patients.

Accordingly, a need exists for an enteral nutritional formulation which meets the nutrient requirements of intensive care patients who may have altered nutritional requirements and compromised absorptive capacity.

SUMMARY OF THE INVENTION

The present invention provides an enteral nutritional formulation that meets the nutrient requirements of intensive care patients who may have compromised absorption capacity. The present invention meets the unique nutrient needs of the patient that are generated due to tissue repair and healing requirements.

To this end, in an embodiment, the present invention provides a method for providing nutritional support to intensive care patients comprising the step of administering a therapeutically effective amount of a composition. The composition preferably includes a protein source; a carbohydrate source; and a lipid source. The protein source is produced with the use of pancreatic enzymes, resulting in a unique peptide profile.

In an embodiment, a method for providing nutritional support to an intensive care patient is provided comprising administering a therapeutically effective amount of a composition with an improved protein source. The protein source contains a protein hydrolysate and free amino acids; the protein hydrolysate includes less than approximately 35%, by weight, peptides having a chain length of more than five amino acids.

In another embodiment, a method for providing nutritional support to a patient is provided that utilizes a composition containing approximately 80% to 85% of protein hydrolysate and approximately 15% to 20% of free amino acids. Preferably, the caloric density of the composition is at least 1.3 Kcal/ml.

In an embodiment, the protein hydrolysate includes less than approximately 35% by weight peptides having a chain length of more than five amino acids.

In yet another embodiment, the free amino acids of the composition comprise less than approximately 20% by weight of the protein source.

In an embodiment, the protein source comprises less than approximately 20% by weight peptides having a chain length of more than nine amino acids.

In another embodiment, the cysteine content of the protein source is at least approximately 0.25% of the total calories.

In an embodiment, a method for providing nutritional support to an intensive care patient is provided comprising administering a therapeutically effective amount of yet another composition. The composition comprises a protein source containing less than 20% peptides, by weight, having a chain length of more than nine amino acids.

If desired the composition can include sources of: arginine; proline; and/or cysteine. Sufficient cysteine is included to replenish the intracellular glutathione of the treated patient. Preferably, the composition contains at least 0.25% of its total calories from cysteine.

An advantage of the present invention is that it provides an enteral nutritional formulation that is designed to optimize nutrient absorption and wound healing in trauma patients.

Moreover, an advantage of the present invention is to provide a composition having a high protein content, a high lipid content, and a high caloric density to meet protein and energy needs.

Furthermore, an advantage of the present invention is to provide a composition that has reduced water and carbohydrate content, reducing the risk of diarrhea due to carbohydrate intolerance, hyperglycemia, over hydration, and the like.

Still further, an advantage of the present invention is that nutrient malabsorption is reduced by the absence of whole proteins and by the use of protein hydrolysate, free amino acids and medium chain triglycerides in the enteral formulation of the present invention.

Additionally, an advantage of the present invention is that it is a ready-to-use formulation, and not a powder that requires mixing before use, reducing the risk of bacterial contamination during the mixing process.

Moreover, pursuant to the present invention, the use of certain components promotes healing and tissue repair/cell division.

It is also an advantage of the present invention that inflammatory reactions are minimized.

Yet another advantage of the present invention is that it utilizes a composition containing a unique peptide profile. The peptide profile promotes improved tolerance, better absorption, superior nitrogen utilization and retention, more rapid repletion of gut integrity and a reduced length of stay for the patient.

Moreover, another advantage of the present invention is that it utilizes a protein hydrolysate that is produced with pancreatic enzymes, as opposed to microbial enzymes. Such pancreatic-derived peptides are more physiological than those produced with microbial enzymes.

Still further, an advantage of the present invention is that it provides an enteral product designed for intensive care patients that contains a high level of dipeptides and tripeptides. Peptide diets containing a high level of such peptides provides a multitude of benefits to the patient.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides enteral formulations specifically designed for use with intensive care patients. For example, the present invention can be utilized to treat trauma, burn and post-surgery patients. Specifically, the present invention provides methods for providing nutritional support to such patients.

Pursuant to the present invention, an enteral formulation is provided that is designed to optimize nutrient absorption and wound healing in trauma patients. The enteral formulation of the present invention meets the nutrient requirements of such patients with compromised absorptive capacity. The formulation also meets nutrient needs unique to tissue repair and healing of the patients.

Generally, pursuant to the present invention, a ready-to-use enteral formulation is provided. The formulation can provide the total nutritional requirements of the intensive care patient or can act as a supplement. The product is designed preferably to be fed to the patient by tube. The product can be provided, for example, in cans or a spike and hang bag. The product is ready to use and does not require reconstitution or mixing prior to use.

In a preferred embodiment, the enteral formulation has a high caloric content. In an embodiment, preferably, the caloric content is between approximately 1.3 to about 1.5 Kcal/ml. Providing a moderate-to-high caloric intake is necessary to spare protein. Caloric needs in severe trauma, burn, and post-surgical patients typically range from 25 to about 35 Kcal/Kg, e.g., 1800 to 2500 Kcal for a convalescing 70 Kg adult. In fact, severe burn patients can require even higher caloric needs.

Additionally, due to increased metabolic activity, such patients require high protein intake to reduce negative nitrogen balance and support wound repair. Protein needs average 2.0 g of protein per Kg body weight or, e.g., 140 grams of protein per day for a convalescing 70 Kg adult. Therefore, the formulation has a high protein content, preferably at least approximately 22% of the calories of the product are provided as protein. In an embodiment, up to 28% of the calories are provided as protein.

Pursuant to the present invention, the protein source of the composition preferably includes a protein hydrolysate and free amino acids. The use of protein hydrolysate and free amino acids reduces the potential for nutrient malabsorption. A variety of hydrolyzed proteins can be utilized in the present invention. Suitable examples include casein hydrolysate and whey hydrolysate. Preferably, the protein source includes approximately 80% to 85% of protein hydrolysate and approximately 15% to 20% of free amino acids.

Pancreatic enzymes are preferably utilized to produce the protein hydrolysate of the present invention. The present invention is a peptide-based diet with high levels of di- and tripeptides. A variety of benefits arise from utilizing a protein source containing primarily dipeptides and tripeptides. For example, when compared to either a diet based on whole proteins or one containing primarily or solely free amino acids, the use of such peptide diets improves tolerance, promotes absorption, results in superior nitrogen utilization and retention, increases the repletion of gut integrity and possibly reduces the length of stay for a patient. Suitable hydrolysis methods that can be utilized to produce the protein hydrolysate of the present invention are described in various U.S. patents. For example, U.S. Pat. No. 4,427,658 entitled: "Total Enzymatic Hydrolysate From Whey Proteins and Process of Obtaining the Same," U.S. Pat. No. 4,358,465 entitled "Phosphopeptides From Casein-Based Material" (as well as the continuations and divisions therefrom, namely U.S. Pat. Nos. 4,495,176; 4,740,462; 4,816,398; 5,028,589) and U.S. Pat. No. 4,361,587 entitled: "Phosphopeptides From Casein-Based Material" (and related patents, such as U.S. Pat. No. 4,980,450) describe enzymatic hydrolysis by means of utilizing a proteolytic enzyme (e.g. pancreatin) that may be utilized to produce the protein hydrolysate of the present invention. The disclosure of these patents is hereby incorporated herein by reference. The pancreatic-derived peptides that are produced by such hydrolysis methods are generally more physiological than those produced by a microbial enzyme hydrolysis system. Thus, the present invention preferably includes such pancreatic-derived peptides.

The protein source of the present invention contains a unique peptide profile. In an embodiment, the protein hydrolysate in combination with free amino acids contains less than approximately 20% free amino acids, by weight, and less than approximately 20% peptides, by weight, with a chain length of more than nine amino acids. The hydrolysate of the present invention preferably contains less than approximately 35% peptides, by weight, with a chain-length of more than five amino acids.

As noted above, the protein source of the present invention includes a portion as free amino acids. In an embodiment, the protein source is enriched with arginine and proline as free amino acids. The hydrolysate source also preferably includes a sufficient amount of cysteine to replenish intracellular glutathione in the patient. Providing a high arginine, proline and/or cysteine content promotes wound healing and tissue repair/cell division.

In an embodiment, approximately 25% of the total caloric content of the product is protein. Pursuant to the present invention, either a single hydrolyzed protein or a combination of at least two hydrolyzed proteins can be utilized. For instance, in an embodiment, approximately 80% to 85% of the protein will be partially hydrolyzed casein, approximately 13% to 15% arginine and approximately 4% to 6% proline. In another embodiment, approximately 50% to 55% of the protein will be partially hydrolyzed casein, approximately 30% to 35% partially hydrolyzed whey protein and approximately 13% to 15% will be arginine. In choosing the protein source, the present invention maximizes the natural available levels of desirable amino acid such as arginine, cysteine, proline and glutamine at the highest bioavailability and product stability.

The formulation of the present invention also includes a lipid fraction. Preferably, approximately 33% to about 45% of the formulation, by calories, is provided as a lipid. In a preferred embodiment, 39% of the calories are provided as a lipid.

The lipid fraction contains significant amounts of omega-3 rich fatty acids and medium chain triglycerides (MCTs). Preferably, the lipid fraction comprises approximately 40% to about 60% by calories MCTs. MCTs are more easily absorbed and metabolized as compared to long chain triglycerides (LCTs). The use of MCTs will reduce the risk of the potential for nutrient malabsorption. A low omega-6 content and a high omega-3 content are provided. Preferably, the ratio of omega-6 to omega-3 fatty acids is less than 2.0:1. The low omega-6:omega-3 ratio reduces the incidence and severity of inflammatory reactions. Omega-3 fatty acids may modulate the negative, immune-mediated reactions brought about by high omega-6 intake. Therefore, oil blends which contain omega-3 (or are, at a minimum, low in omega-6) are preferred.

Accordingly, in an embodiment, a fish oil rich in omega-3 fatty acids is preferred, as fish oils contain two longer chain length omega-3 fatty acids: eicosapentaenoic acid (EPA, C22:5, n3) and docosahexaenoic acid (DHA, C22:6, n3). Soy oil is also preferred, in that it contains approximately 7% linolenic acid (C18:3, n3), in order to insure that a safe minimum level of shorter length omega-3 fatty acids is delivered, and also contains approximately 50–55% linoleic acid (C18:2, n-6), in order to insure that a safe minimum level of omega-6 fatty acids is delivered (essential fatty acids). In an embodiment of the present invention, the lipid component comprises by weight 50% MCT, 25% fish oil and 25% soy oil (includes soy oil and soy lecithin).

In addition to the ability of omega-3 to modulate inflammatory reactions, likewise, the antioxidant vitamins and minerals also reduce the incidence of severity of inflammatory reactions.

By utilizing a formulation having high protein and fat content, protein and energy requirements are met. However, at the same time, pursuant to the present invention, the formulation includes reduced water and carbohydrate content. This reduces the risk of over hydration, hyperglycemia, and carbohydrate intolerance.

Preferably, the formulation is approximately 35% to about 40%, by calories, carbohydrates. By way of example, the carbohydrates can be chosen from maltodextrin, corn starch, sucrose, and corn syrup solids.

In an embodiment, the present invention includes soluble or insoluble fiber, and/or carob pod powder or extract that is rich in insoluble tannin. In an enteral product, especially one to be provided by tube feeding, this provides anti-diarrhea characteristics. Magnesium can be reduced below U.S. RDA levels (400 mg/day), further limiting the potential for tube-fed induced diarrhea. An example of the use of tannin to reduce the incidence of diarrhea is set forth in U.S. patent application Ser. No. 887,360 entitled: "ENTERAL FORMULATION DESIGNED TO REDUCE DIARRHEA IN TUBE-FED PATIENTS" now abandoned, the disclosure of which is hereby incorporated herein by reference.

Preferably, anti-oxidant vitamins and minerals are increased to above the U.S. RDAs. This will insure that the patient receives at least 100% of the U.S. RDA as well as insure that any additional micronutrients that are necessary due to the patient's state will be provided. The formulation, in an embodiment, will provide approximately 5–6 mg/1500 Kcal of beta-carotene. Beta-carotene is a precursor for Vitamin A and has some unique antioxidant properties.

Of course, it will be appreciated that a variety of formulations are possible in accordance with the present invention. An example of a formulation in accordance with the present invention includes a formulation having a caloric density of 1.5 Kcal/ml. This is equivalent to 375 Kcal/250 ml which will, in a preferred embodiment, by one unit (can or container) of product.

In this embodiment, preferably, protein comprises 25%, by calories, of the product. This is equivalent to 94 grams/liter. A variety of different components are possible for the protein portion of the product. In an embodiment, casein hydrolysate plus arginine can be utilized. In a further embodiment, casein hydrolysate plus arginine plus proline can be utilized for the protein component. In a preferred embodiment, casein hydrolysate, whey hydrolysate and arginine can be utilized as the protein source.

In this preferred embodiment, the lipid component preferably comprises approximately 39% of the calories of the product. This will be equal to approximately 65 grams/liter. In the embodiment, approximately 50% of the lipid component is MCTs and 25% of the lipid component is fish oil. Preferably, 19 to 21% of the lipid component is soy oil and 4–6% soy lecithin. This will provide an omega-6:omega-3 ratio of approximately 1.8:1.

Preferably, in this embodiment, the carbohydrates comprise 36% of the calories. This is equivalent to 135 g/l. In the embodiment, maltodextrin and corn starch are used. Preferably, the maltodextrin provides approximately 84% of the carbohydrate source, where as, the corn starch provides approximately 14% of the carbohydrate source.

The total calories/nitrogen in this embodiment is approximately 90:1. The total non-protein calories/grams of nitrogen is approximately 67:1. Due to the use of the peptide-base protein source, osmolality will be approximately 600 mOsm/kgH$_2$O. It is envisioned that the shelf-life of the product will be approximately 12 months.

Pursuant to the present invention, the omega-3 fatty acids as a percent of the total calories of the product will be greater than 2.3%. Anti-inflammatory activity is believed to be achieved at 2.2% to 3% of the calories of the product. Anti-thrombotic and hypolipidemic is also believed to be a benefit of such high levels of omega-3. As set forth above, preferably, fish oil and soy oil are utilized. A number of potential beneficial effects are achieved by using fish oil.

Most typical nutritional products have less than 2.3% of the total calories as omega-3 fatty acids. To this end, the following commercially available products have the following omega-3 fatty acid content (as a % of total calories): IMPACT® 1.6%; IMMUN-AID® 1.0%; PEPTAMEN® VHP 1%; Promote 0.9%; TRAUMACAL® 0.3%; and PEPTAMEN® 0.2%.

In an embodiment of the present invention, the formulation of the present invention includes at least 3% of the total calories as arginine. Enhanced wound healing with arginine is believed to be provided at quantities greater than 3% of the total calories.

Additionally, in an embodiment, the present invention includes significant amounts of proline. In an embodiment, the proline content is at least 2.0% of the total calories. Proline content as a percent of specific proteins is as follows: gelatin=16.1%; casein=9.6%; whey=5.7%; and soy=5.4%.

Still further, in an embodiment, the present invention can include significant amounts of cysteine. In an embodiment, the present invention can provide approximately 0.06% of the total calories as cysteine. This is substantially in line with ad-libitum diets. However, the present invention, in a preferred embodiment, provides 0.25% of the total calories as cysteine. This percentage of cysteine content can be achieved if approximately 40% of the hydrolysate is from whey protein hydrolysate. Preferably, a sufficient amount of cysteine is included in the composition to replenish intracellular glutathione in the patient. Cysteine content of various proteins is as follows: casein=0.3%; total milk products= 0.9%; soy protein=1.2%; whey protein=2.0%; and egg white protein=2.5%.

Pursuant to the present invention, non-protein calories/ grams of nitrogen (NPC/gN) is determined so as to provide a composition that spares the use of proteins as the calorie source. Patients with severe metabolic stress (trauma, burns) preferably should receive a product with an NPC/gN of less than 100:1 because of their increased protein requirements. Pursuant to the present invention, the formulation provides compositions having less than or equal to 70:1. The weight/ nitrogen weight of certain proteins is as follows: arginine 3.11:1; glutamine 5.21:1; casein 6.25:1; protein 6.25:1; whey 6.38:1; proline 8.21:1; branched chain amino acids 8.79:1.

By way of example, and not limitation, examples of formulations of the present invention will now be given.

FORMULA EXAMPLE NO. 1

A liquid, ready-to-use enteral product With protein at 25% of total calories: 87% from partially hydrolyzed casein and 13% from the free amino acid arginine. Carbohydrates would be 35–40% of calories. Lipids comprise 38–42% of calories, preferably a blend of medium chain triglycerides (50%), fish oil (25%), soy oil and soy lecithin (25% total of both soys). Vitamin and mineral content would meet preferably daily requirements in 1500 calories.

FORMULA EXAMPLE NO. 2

A liquid, ready-to-use enteral product with protein at 25% of total calories: 50% from partially hydrolyzed casein, 34% from partially hydrolyzed whey protein, 12% from the free amino acid arginine and 4% from the free amino acid proline. Carbohydrates would be 35–40% of calories. Lipids comprise 38–42% of calories, preferably a blend of medium chain triglycerides (50%), fish oil (25%), soy oil and soy lecithin (25% total of both soys). Vitamin and mineral content Would meet preferably daily requirements in 1500 calories.

FORMULA EXAMPLE NO. 3

A liquid ready-to-use enteral product made pursuant to the present invention may have the following nutrient profile:

| NUTRIENT COMPOSITION | Per 250 ML |
| --- | --- |
| Protein | 23.45 g |
| Carbohydrate | 33.75 g |
| Fat | 16.9 g |
| Vitamin A | 1500 I.U. |
| Beta-Carotene | 1.35 mg |
| Vitamin D | 100 I.U. |
| Vitamin E | 25 I.U. |
| Vitamin K | 18.75 mcg |

-continued

| NUTRIENT COMPOSITION | Per 250 ML |
| --- | --- |
| Vitamin C | 250 mg |
| Thiamine ($B_1$) | 0.75 mg |
| Riboflavin ($B_2$) | 0.6 mg |
| Niacin | 7 mg |
| Vitamin $B_6$ | 1.0 mg |
| Folic Acid | 135 mcg |
| Pantoth. Acid | 3.5 mg |
| Vitamin $B_{12}$ | 2.0 mcg |
| Biotin | 100 mcg |
| Choline | 112.5 mg |
| Taurine | 37.5 mg |
| L-Carnitine | 37.5 mg |
| Calcium | 250 mg |
| Phosphorus | 250 mg |
| Magnesium | 100 mg |
| Zinc | 9 mg |
| Iron | 4.5 mg |
| Copper | 0.75 mg |
| Manganese | 1.0 mg |
| Iodine | 40 mcg |
| Sodium | 292 mg |
| Potassium | 468 mg |
| Chloride | 435 mg |
| Chromium | 35 mcg |
| Molybdenum | 55 mcg |
| Selenium | 25 mcg |

In this example, the protein source preferably comprises approximately 52% casein hydrolysate, approximately 35% whey hydrolysate, and approximately 13% L-arginine. The carbohydrate source preferably includes approximately 86% maltodextrin and approximately 14% corn starch. Lastly, the lipid source preferably includes approximately 50% from medium-chain triglycerides, approximately 25% from fish oil, approximately 19% from soy oil, and approximately 6% from soy lecithin.

By way of example, and not limitation, a contemplative example of the use of the present invention will now be given.

CONTEMPLATIVE EXAMPLE NO. 1

Two hundred patients admitted to intensive care units with moderate to severe trauma are nutritionally supported by the use of tube-fed enteral formulas. Half receive a whole protein based product at 1.0 calories/mL, with protein as 22% of calories (a combination of whole protein and free amino acid arginine), carbohydrates at 50–55% of calories and lipids at 20–25% of calories, with 25% as MCT and the remainder fish oil and sunflower oil. Vitamin and mineral U.S. RDAs met in 1500 calories (1500 mL). Half receive a formula described in this invention: a liquid, ready-to-use enteral product at 1.3–1.5 Kcal/mL with protein at 25% of total calories (87% from partially hydrolyzed casein and 13% from the free amino acid arginine), carbohydrates at 35–40% calories and lipids at 38–42% of calories, with half of the lipid as MCT, 25% fish oil and 25% soy oil and soy lecithin. Vitamin and mineral U.S. RDAs met in 1500 calories (1000 mL).

Many of the patients receiving the whole protein diet were unable to receive the recommended calorie and protein intakes of 2200–2500 calories and 140 grams protein because of intolerance and diarrhea and conflicts with the need to not overhydrate. By comparison, the elemental and calorically dense product described in this invention, it is believed, will be able to deliver 2250 calories and 140 grams protein in 1.5 liters/day with a minimal incidence of intolerance or diarrhea. When using APACHE scoring to predict outcomes, the patients fed the enteral diet described in this invention will, it is believed, have a shorter average length of stay and fewer inflammatory complications than would have been expected based on experiences with whole protein-based diets which contain less than 2.3% of calories as a mixture of omega-3 fatty acids (linolenic, EPA and DHA).

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for providing nutritional support to a trauma, burn or post-surgery patient comprising the step of enterally administering to the patient a therapeutically effective amount of a composition comprising:

22% to about 28% of the total calories as a protein source including protein hydrolysate and free amino acids, the protein hydrolysate including less than 35% by weight, peptides having a chain length of more than five amino acids;

a lipid source; and a carbohydrate source.

2. The method of claim 1 wherein the free amino acids comprise less than 20% by weight of the protein source.

3. The method of claim 1 wherein the protein source comprises less than 20% by weight peptides having a chain length of more than nine amino acids.

4. The method of claim 1 wherein the composition includes a cysteine content of at least 0.25% of the total calories of the composition.

5. The method of claim 1 wherein the protein hydrolysate comprises 70% to 50% of casein hydrolysate and 30% to 50% whey hydrolysate.

6. The method of claim 1 wherein the lipid source includes a source of medium chain triglycerides, a source of omega-3 fatty acids and a source of omega-6 fatty acids.

7. The method of claim 1 wherein the protein hydrolysate is produced through use of pancreatic enzymes.

8. The method of claim 1 wherein the protein source contains substantially no whole proteins.

9. A method for providing nutritional support to a trauma, burn or post-surgery patient comprising the step of enterally administering to the patient a therapeutically effective amount of a composition comprising:

a protein source comprising approximately 80% to 85% by weight of protein hydrolysate and 15% to 20% of free amino acids;

a lipid source;

a carbohydrate source; and the composition having a caloric density of at least 1.3 Kcal/ml.

10. The method of claim 9 wherein the protein hydrolysate includes less than 35% by weight peptides having a chain length of more than five amino acids.

11. The method of claim 9 wherein the free amino acids comprise less than 20% by weight of the protein source.

12. The method of claim 9 wherein the protein source comprises less than 20% by weight peptides having a chain length of more than nine amino acids.

13. The method of claim 9 wherein the protein hydrolysate comprises 70% to 50% of casein hydrolysate and 30% to 50% of whey hydrolysate.

14. The method of claim 9 wherein the protein hydrolysate is produced through use of pancreatic enzymes.

15. The method of claim 9 wherein the protein source contains substantially no whole proteins.

16. A method for providing nutritional support to a trauma, burn or post-surgery patient comprising the step of enterally administering to the patient a therapeutically effective amount of a composition comprising:

22% to about 28% of the total calories as a protein source including protein hydrolysate and free amino acids, the protein hydrolysate comprising less than 20%, by weight, peptides having a chain length of more than nine amino acids;

a lipid source; and a carbohydrate source.

17. The method of claim 16 wherein the protein hydrolysate comprises less than 35% by weight peptides having a chain length of more than five amino acids.

18. The method of claim 16 wherein the free amino acids comprise less than 20% by weight of the protein source.

19. The method of claim 16 wherein the protein hydrolysate is produced through use of pancreatic enzymes.

20. The method of claim 16 wherein the protein source contains substantially no whole proteins.

21. A method for providing nutritional support to a trauma, burn or post-surgery patient comprising the step of enterally administering to the patient a therapeutically effective amount of a composition comprising:

a protein source including protein hydrolysate and free amino acids, the protein source having a cysteine content of at least 0.25% of the total calories of the composition;

a lipid source; and a carbohydrate source.

22. A method for providing nutritional support to a trauma, burn or post-surgery patient comprising the step of enterally administering to the patient a therapeutically effective amount of a composition comprising:

a protein source which provides about 22% to about 28% of the total calories and which includes protein hydrolysate and free amino acids, the protein hydrolysate comprising less than 35%, by weight, peptides having a chain length of more than five amino acids and less than 20%, by weight, peptides having a chain length of more than nine amino acids;

a lipid source which provides about 33% to 45% of the total calories, the lipid source including a source of medium chain triglycerides, a source of omega-3 fatty acids and a source of omega-6 fatty acids; and a carbohydrate source which provides 35% to about 40% of the total calories.

* * * * *